No. 661,093. Patented Nov. 6, 1900.
D. B. WARREN.
BAIT BOX.
(Application filed June 16, 1900.)
(No Model.)
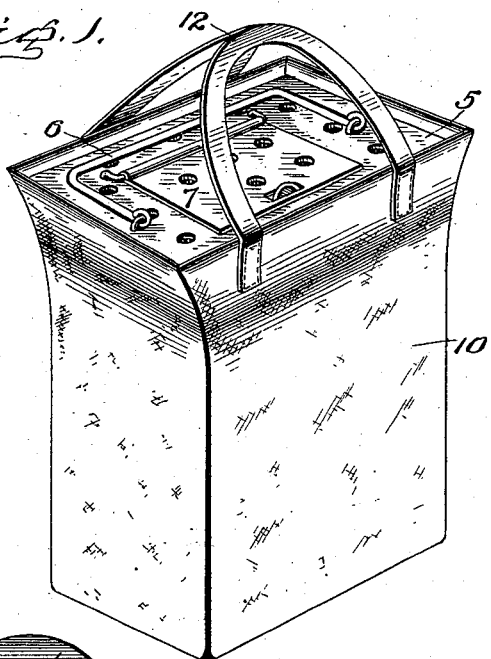
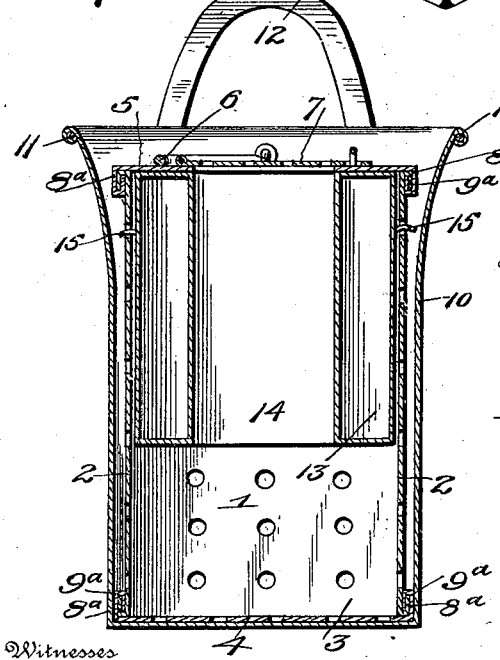
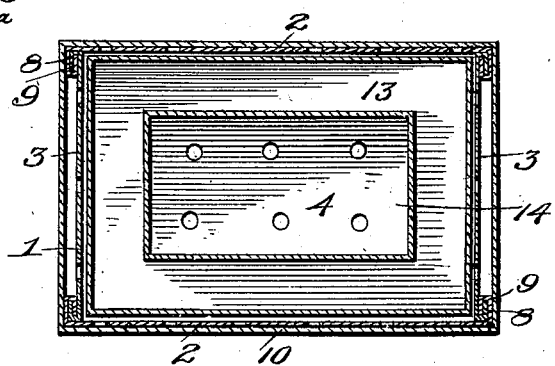
Witnesses
Inventor
D. B. Warren
by H. B. Willson & Co.
Attorneys
THE NORRIS PETERS CO., PHOTO-LITHO., WASHINGTON, D. C.

UNITED STATES PATENT OFFICE.

DAVID B. WARREN, OF WEST PLAINS, MISSOURI.

BAIT-BOX.

SPECIFICATION forming part of Letters Patent No. 661,093, dated November 6, 1900.

Application filed June 16, 1900. Serial No. 20,593. (No model.)

*To all whom it may concern:*

Be it known that I, DAVID B. WARREN, a citizen of the United States, residing at West Plains, in the county of Howell and State of Missouri, have invented certain new and useful Improvements in Bait-Boxes; and I do declare the following to be a full, clear, and exact description of the invention, such as will enable others skilled in the art to which it appertains to make and use the same.

My invention relates to improvements in bait-boxes, and particularly to boxes for containing live bait for game-fishing, such as minnows.

The objects of the invention are, first, to provide a bait-box which is collapsible and designed to be packed in compact form for convenience in storing and carrying it from place to place when empty; second, to provide a perforated box of this type and a waterproof inclosing casing therefor, whereby an ample supply of air to the interior of the box is insured, the escape of the water prevented, and the box adapted to be carried from place to place while fishing without injury to the minnows, and, third, to provide means to insure the floating of the box when submerged in deep water.

With these and other minor objects in view the invention consists of certain novel features of construction, combination, and arrangement of parts, as will be hereinafter more fully described, and particularly pointed out in the appended claims.

In the accompanying drawings, Figure 1 is a perspective view of the complete device as adapted for carrying live bait from place to place. Fig. 2 is a vertical longitudinal section of the same. Fig. 3 is a horizontal section.

Referring now more particularly to the drawings, in which like reference-characters designate corresponding parts throughout the several views, 1 represents the collapsible bait-box proper, formed of sheet metal and comprising the perforated or foraminous side walls 2, end walls 3, bottom 4, and top or cover 5, the latter having a bail-handle 6 for convenience in handling the box and an opening closed by a hinged lid 7, whereby access to the interior of the box may be had. The side walls 2 are provided at their side edges with longitudinal grooves 8, formed by bending the metal outwardly and inwardly and at right angles to the walls, as shown in Fig. 3, and these grooves receive tongues 9, formed on the longitudinal side edges of the end walls 3. Corresponding grooves $8^a$ are likewise formed at the side edges of the bottom and top sections 4 and 5 and interlock with tongues $9^a$, formed upon the upper and lower edges of the side walls 2. By this construction the walls or sections forming the box are detachably connected and may be connected with and disconnected from each other by an endwise sliding movement, and when disconnected the sections may be laid flat upon one another and bound together for storage or transportation, thus providing a box which is readily collapsible and may be readily carried about in a satchel or other like receptacle.

For convenience in transporting the box from place to place when filled and to prevent the escape of the water contained therein I employ an outer containing bucket or casing 10, made of canvas or other suitable waterproof material and in which the box is inserted, as shown in the drawings. This casing is open at the top and is of approximately the same depth as the bucket and of an internal area to snugly inclose the same and yet permit of the inlet of air thereto. The mouth or open end of the casing is distended or held open for this purpose by a resilient band 11 of wire, and handles 12 are applied on opposite sides of the mouth to enable the casing, with its contents, to be conveniently carried. The casing being made of flexible waterproof material serves to prevent the escape of the water from the box, and when the box is collapsed may be folded and packed away in close compass therewith. When the box is submerged in water to confine the bait or used solely for this purpose, the inclosing casing may be dispensed with. When the casing is applied, the tongue-and-groove connections $8^a$ $9^a$ at the lower ends of the end walls of the box serve as means to hold the lower ends of the end walls of the casing away from the box, while the band 11 holds the mouth of the casing open. By these means vertical passages are formed at the ends of the box for the downflow of fresh air, so as to insure ample ventilation throughout the entire area of the box.

I may employ in connection with the box, if desired, an air-chamber to adapt the box to float when separated from the inclosing casing and submerged in deep water. This air-chamber comprises an air-tight vessel 13, adapted to fit within the box and to be suspended therein below the cover 5. The chamber is provided with a central passage 14, of the same size as the lid 7, to provide for the easy capture and removal of the bait. Hooks 15 or other suitable fastening means are provided to retain the vessel in position.

From the foregoing description, taken in connection with the drawings, the construction and manner of employing the invention will be readily understood.

Changes in the form, proportion, and minor details of construction may be made within the scope of the invention without departing from the spirit or sacrificing any of the advantages thereof.

Having thus described my invention, what I claim, and desire to secure by Letters Patent, is—

1. A live-bait holder comprising a perforated metallic box, an inclosing flexible waterproof casing therefor having an open mouth, and means for holding the casing at points away from said box to provide vertical passages for the circulation of air, substantially as set forth.

2. A collapsible live-bait box, comprising side walls provided at their side edges with longitudinal grooves and at their upper and lower edges with tongues, end walls provided at their side edges with tongues to slidably engage said grooves, and top and bottom sections provided with grooves to receive the upper and lower tongues of said side walls, whereby the parts are adapted to be connected with and disconnected from each other by an endwise sliding movement, substantially as described.

3. A collapsible live-bait box, comprising in its construction, side, end, top and bottom walls detachably connected, said top wall being provided with an opening, a lid closing said opening, and an air-chamber removably arranged within the box and having a central open passage in line with said lid and opening, substantially as set forth.

4. A collapsible live-bait box, comprising perforated side, end, top and bottom walls detachably connected, and a removable air-chamber provided with means to engage the perforations in the side or end walls of the box and adapted to be suspended therein, substantially as described.

In testimony whereof I have hereunto set my hand in presence of two subscribing witnesses.

DAVID B. WARREN.

Witnesses:
R. S. HOGAN,
J. S. HOLLOWAY.